(12) United States Patent
Schartner et al.

(10) Patent No.: US 11,414,907 B2
(45) Date of Patent: Aug. 16, 2022

(54) DOOR ASSEMBLY AND METHOD FOR MAKING THE SAME, AND AIRCRAFT INCLUDING A DOOR ASSEMBLY

(71) Applicant: Gulfstream Aerospace Corporation, Savannah, GA (US)

(72) Inventors: Todd Schartner, Savannah, GA (US); Julien Talbot, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 612 days.

(21) Appl. No.: 16/458,866

(22) Filed: Jul. 1, 2019

(65) Prior Publication Data
US 2021/0002933 A1 Jan. 7, 2021

(51) Int. Cl.
*E06B 3/00* (2006.01)
*E05D 11/10* (2006.01)
*E05B 15/00* (2006.01)
*B64C 1/14* (2006.01)

(52) U.S. Cl.
CPC ...... *E05D 11/1028* (2013.01); *E05B 15/0073* (2013.01); *B64C 1/1423* (2013.01); *E05Y 2201/46* (2013.01); *E05Y 2900/132* (2013.01); *E05Y 2900/502* (2013.01)

(58) Field of Classification Search
CPC ..... B64C 1/1407; B64C 1/1423; B64D 11/02; E05C 17/025; E05C 17/28; E05D 11/1028; E05D 7/081; E05D 11/06; E05D 15/54; E05F 5/06; E05Y 2201/218; E05Y 2201/418; E05Y 2201/424; E05Y 2201/46; E05Y 2201/474; E05Y 2201/624; E05Y 2201/708; E05Y 2600/41; E05Y 2600/46; E05Y 2900/502

USPC ......... 49/507, 501, 339, 380, 386, 414, 371, 49/381; 16/50, 54, 49, 61, 68, 63, 85, 82, 16/72, 71, DIG. 10
See application file for complete search history.

(56) References Cited

U.S. PATENT DOCUMENTS

| | | | |
|---|---|---|---|
| 5,075,923 A | 12/1991 | Taylor | |
| 5,095,654 A * | 3/1992 | Eccleston | E05F 15/53 292/144 |
| 5,096,238 A * | 3/1992 | Mintz | E05C 9/02 49/395 |
| 7,219,391 B1 | 5/2007 | Luca | |

(Continued)

FOREIGN PATENT DOCUMENTS

FR   1373516 A   9/1964

*Primary Examiner* — Chi Q Nguyen
(74) *Attorney, Agent, or Firm* — LKGlobal | Lorenz & Kopf, LLP

(57) ABSTRACT

Door assemblies, aircraft including door assemblies, and method for making door assemblies are provided. In one example, a door assembly includes a hinge subassembly and a door pivotally coupled to the hinge subassembly. The door has a channel disposed therein with a holding member disposed proximate a channel distal portion. A sliding member is movably disposed in the channel. An arm has a first portion pivotally coupled to a second hinge subassembly and a second portion pivotally coupled to the sliding member to move the sliding member as the door moves between a closed position and an open position. A stay member is coupled to the sliding member to move towards the holding member which holds the stay member in position when the door is moved to the open position to hold the door open.

20 Claims, 12 Drawing Sheets

(56) References Cited

U.S. PATENT DOCUMENTS

| | | | |
|---|---|---|---|
| 2008/0289144 A1* | 11/2008 | Vanini | E05F 1/1261 16/221 |
| 2011/0283624 A1* | 11/2011 | Baer | E05D 7/04 49/506 |
| 2012/0279130 A1* | 11/2012 | Appeldoorn | E06B 3/4645 49/252 |
| 2014/0109480 A1* | 4/2014 | Karallus | E05B 17/2038 49/294 |

* cited by examiner

DOOR ASSEMBLY AND METHOD FOR MAKING THE SAME, AND AIRCRAFT INCLUDING A DOOR ASSEMBLY

TECHNICAL FIELD

The technical field relates generally to door assemblies, and more particularly, relates to door assemblies including a mechanism for holding the door open, methods for making such door assemblies, and aircraft including such door assemblies.

BACKGROUND

Vehicles, particularly larger vehicles adapted for longer travel durations, are often equipped with various door assemblies including vehicle interior doors to permit ingress and egress of passengers or other vehicle occupants into various areas of the vehicle. For example, aircraft are provided with lavatory units with interior doors that open to permit access to the lavatory and close to provide privacy.

Often it is desirable to keep such doors temporarily open to provide convenient access to various areas of the vehicle. For example, when an aircraft is on the ground, service personnel who are loading the aircraft with supplies will leave many of the aircraft doors open including the main outside door(s) attached to the fuselage and various interior door(s), to allow efficient servicing, loading, unloading, and/or restocking of supplies to the aircraft. However, because these doors including the main outside door(s) are left open, air current(s) such as a gust of wind or the like can flow through the aircraft causing the doors, particularly the interior doors, to slam shut, possibly causing damage to the door or surroundings structure. In another example, during flight, interior aircraft doors that may have been left open can slam shut when the aircraft banks, accelerates, and/or changes its angle of attack, again possibly causing damage to the door or surroundings structure.

Accordingly, it is desirable to provide an improved door assembly that overcomes some or all of the foregoing issues. Furthermore, other desirable features and characteristics of the various embodiments described herein will become apparent from the subsequent detailed description and the appended claims, taken in conjunction with the accompanying drawings and this background.

SUMMARY

Various non-limiting embodiments of a door assembly, an aircraft including a door assembly, and a method for making a door assembly are provided herein.

In a first non-limiting embodiment, the door assembly includes, but is not limited to, a first hinge subassembly that is configured to couple to a support structure. The door assembly further includes, but is not limited to, the door that is pivotally coupled to the first hinge subassembly about a first rotational axis to move between a closed position and an open position. The door has a channel disposed therein extending from a channel proximal portion to a channel distal portion. The door assembly further includes, but is not limited to, a holding member that is disposed proximate the channel distal portion. The door assembly further includes, but is not limited to, a sliding member that is movably disposed in the channel proximal the holding member. The door assembly further includes, but is not limited to, a second hinge subassembly that is configured to couple to the support structure. The door assembly further includes, but is not limited to, an arm that has a first portion pivotally coupled to the second hinge subassembly about a second rotational axis that is different than the first rotational axis. The arm has a second portion that is pivotally coupled to the sliding member to move the sliding member in the channel between the channel proximal portion and the channel distal portion as the door moves between the closed position and the open position, respectively. The door assembly further includes, but is not limited to, a stay member that is coupled to the sliding member. The stay member is configured to move with the sliding member towards the holding member and to be held in position by the holding member when the door is moved to the open position to hold the door open.

In another non-limiting embodiment, an aircraft includes, but is not limited to, a fuselage including a bulkhead structure that separates a cabin area and an adjacent area. The aircraft further includes, it is not limited to, a door assembly that is disposed between the cabin area and the adjacent area. The door assembly includes, but is not limited to, a first hinge subassembly that is coupled to the bulkhead structure. The door assembly further includes, but is not limited to, a door that is pivotally coupled to the first hinge subassembly about a first rotational axis to move between a closed position and an open position. The door has a channel disposed therein extending from a channel proximal portion to a channel distal portion. The door assembly further includes, but is not limited to, a holding member that is disposed proximate the channel distal portion. The door assembly further includes, but is not limited to, a sliding member that is movably disposed in the channel proximal the holding member. The door assembly further includes, but is not limited to, a second hinge subassembly that is coupled to the bulkhead structure. The door assembly further includes, but is not limited to, an arm that has a first portion pivotally coupled to the second hinge subassembly about a second rotational axis that is different than the first rotational axis. The arm has a second portion that is pivotally coupled to the sliding member to move the sliding member in the channel between the channel proximal portion and the channel distal portion as the door moves between the closed position and the open position, respectively. The door assembly further includes, but is not limited to, a stay member that is coupled to the sliding member. The stay member is configured to move with the sliding member towards the holding member and to be held in position by the holding member when the door is moved to the open position to hold the door open.

In another non-limiting embodiment, a method for making a door assembly includes, but is not limited to, coupling a first hinge subassembly to a support structure. The method further includes, but is not limited to, pivotally coupling a door to the first hinge subassembly about a first rotational axis for moving the door between a closed position and an open position. The door has a channel disposed therein extending from a channel proximal portion to a channel distal portion. The method further includes, but is not limited to, disposing a holding member proximate the channel distal portion. The method further includes, but is not limited to, movably disposing a sliding member in the channel proximal the holding member. The method further includes, but is not limited to, coupling a second hinge subassembly to the support structure. The method further includes, but is not limited to, pivotally coupling a first portion of an arm to the second hinge subassembly about a second rotational axis that is different from the first rotational axis. The method further includes, but is not limited to, pivotably coupling a second portion of the arm to the sliding member for moving the sliding member in the channel when the door is moved between the closed position and open positions. The method further includes, but is not limited to, coupling a stay member to the sliding member. The stay member is configured to move with the sliding member towards the holding member and to be held in position by the holding member when the door is moved to the open position to hold the door open.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to door assemblies including a mechanism for holding the door open, methods for making such door assemblies, and aircraft including such door assemblies. The exemplary embodiments taught herein provide a door assembly that includes a first hinge subassembly coupled to a support structure. A door is coupled to the first hinge subassembly about a first rotational axis to move between a closed position and an open position. The door has a channel disposed therein extending from a channel proximal portion to a channel distal portion.

A holding member is disposed in the door proximate the channel distal portion. A sliding member is movably disposed in the channel proximal the holding member. A second hinge subassembly is coupled to the support structure. An arm has a first portion pivotally coupled to the second hinge subassembly about a second rotational axis that is different than the first rotational axis. The arm has a second portion that is pivotally coupled to the sliding member to move the sliding member in the channel between the channel proximal portion and the channel distal portion as the door moves between the closed position and the open position, respectively. A stay member is coupled to the sliding member and moves with the sliding member towards the holding member when the door is moved towards the open position. When the door is in the open position, e.g., substantially fully open position, the holding member holds or otherwise retains the stay member in position, thereby locking the position of the arm that is indirectly supported by the support structure to brace or otherwise hold the door in the open position. In an exemplary embodiment, advantageously by bracing or otherwise holding the door in the open position, the door will not slam shut, thereby preventing damage to the door or surroundings support structure.

Figure 1:
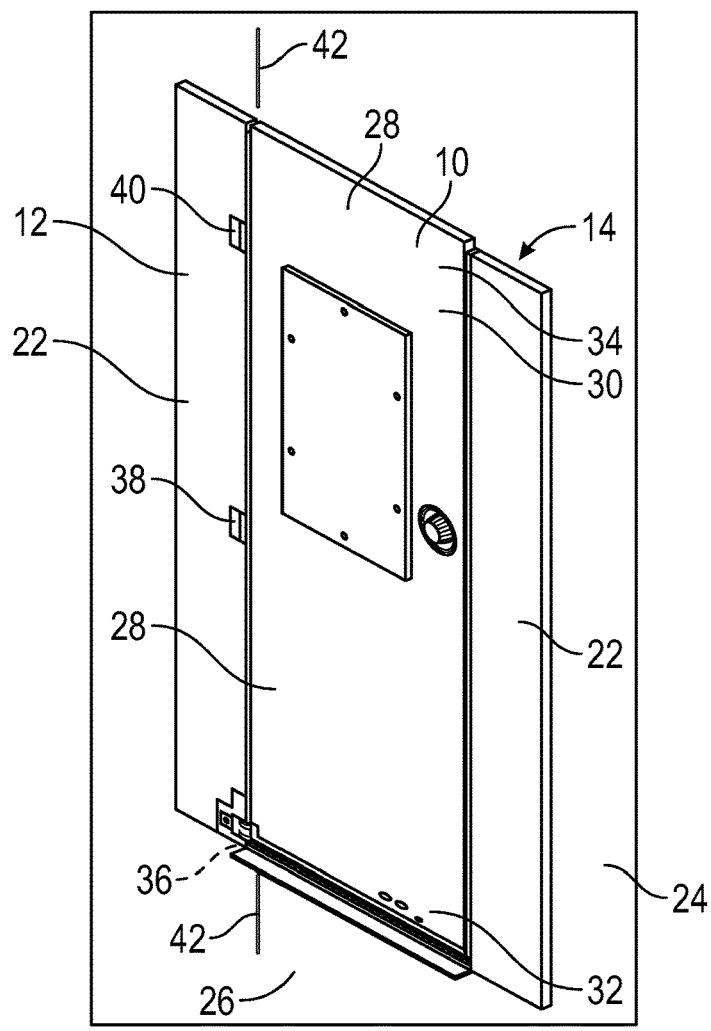
FIG. 1 illustrates a perspective front view of a door assembly mounted to a support structure in a closed position in accordance with an exemplary embodiment.
Figure 2:
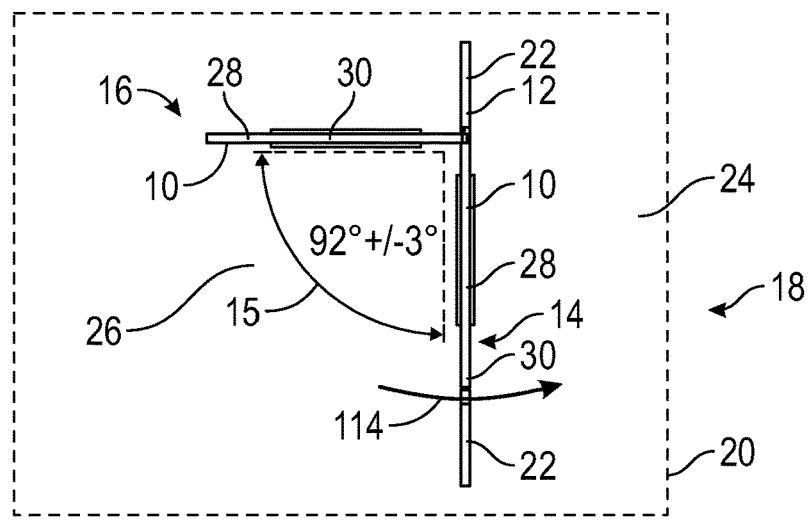
FIG. 2 illustrates a top view of a door assembly mounted to a support structure moving from a closed position to an open position in accordance with an exemplary embodiment.
Figure 3:
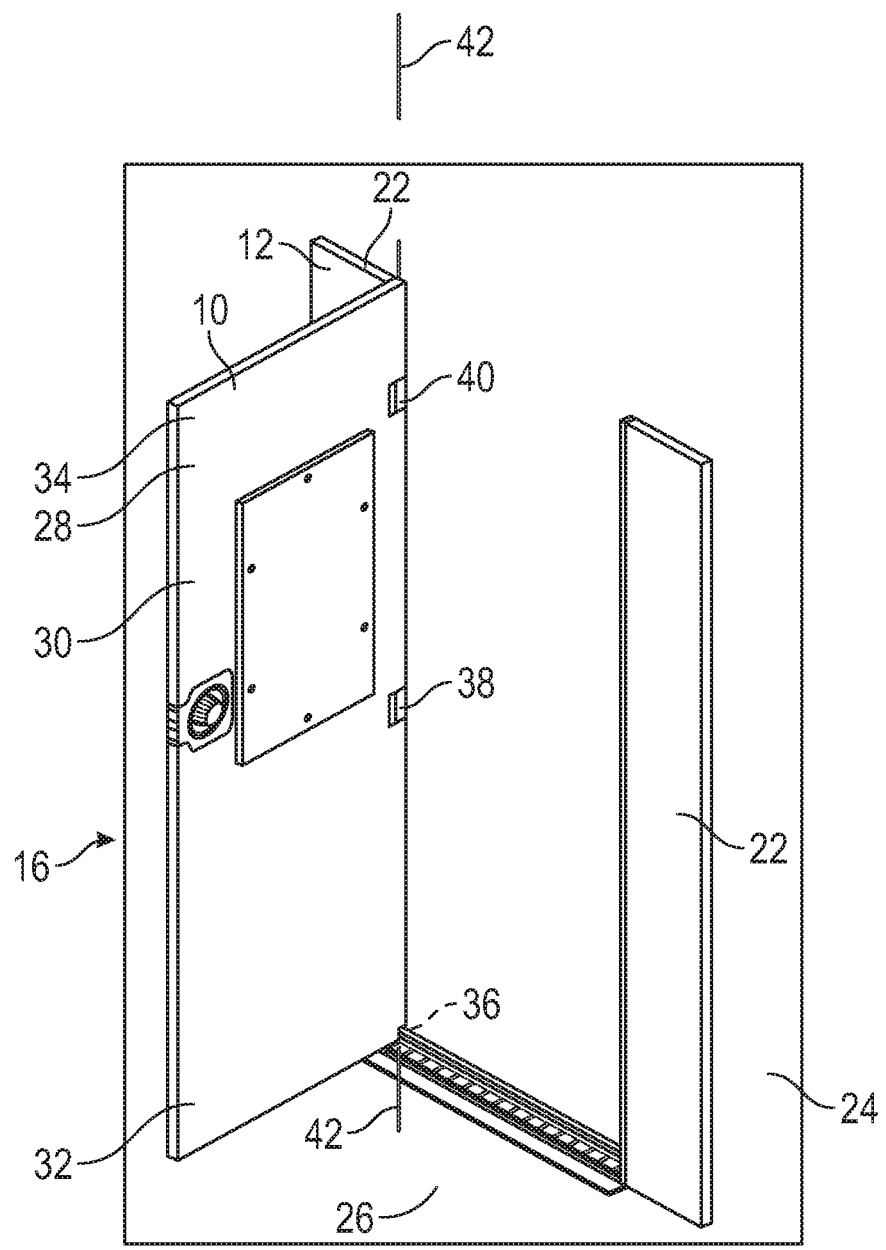
FIG. 3 illustrates a perspective front view of a door assembly mounted to a support structure in an open position in accordance with an exemplary embodiment.

FIG. 1 illustrates a perspective front view of a door assembly 10 mounted to a support structure 12 in a closed position 14 in accordance with an exemplary embodiment. FIG. 2 illustrates a top view of the door assembly 10 moving from the closed position 14 in a direction (indicated by single headed arrow 15) to an open position 16. FIG. 3 illustrates a perspective front view of the door assembly 10 in the open position 16.

As illustrated, the door assembly 10 is an internal door assembly that is disposed within an aircraft 18. The aircraft 18 includes a fuselage 20 and the support structure 12 that forms part of a bulkhead structure 22 (e.g., interior wall) that is disposed in the fuselage 20, for example, separating a cabin area 24 and an adjacent area 26, e.g., lavatory area or other area that is adjacent to the cabin area 24. Although the door assembly 10 is shown as an internal door assembly disposed within the aircraft 18, it is to be understood that the door assembly 10 may be arranged elsewhere in the aircraft, in another vehicle, or within another structure to permit ingress and egress between adjacent areas.

The door assembly 10 includes a door 28. The door 28 has a substantially planar door body 30 that is disposed substantially upright extending vertically from a lower door portion 32 to an upper door portion 34. Referring also to FIGS. 4-7, the door assembly 10 further includes a plurality of door hinge subassemblies 36, 38, and 40 that are coupled e.g., directly attached, to the bulkhead structure 22 and that are substantially vertically aligned. The door body 30 of the door 28 is pivotally coupled to the door hinge subassemblies 36, 38, and 40 about a rotational axis 42 to move between the closed position 14 and the open position 16.

In an exemplary embodiment, disposed adjacent to the hinge subassembly 36 proximate the lower door portion 32, the door assembly 10 includes a mechanism 44 for holding the door 28 open when in or otherwise moved to the open position 16. The mechanism 44 includes a track 46 that is coupled to the door body 30, a holding member 48, a sliding member 50, a hinge subassembly 52, an arm 54, and a stay member 56. In an exemplary embodiment, the track 46, the sliding bar 50, the holding member 48, and the stay member 56 are disposed in the lower door portion 32 and are substantially covered by a close out panel 58 that is disposed along and coupled to a lower-most section of the door body 30.

The track 46 defines a channel 60 extending along the lower door portion 32 from a channel proximal portion 62 to a channel distal portion 64. As illustrated, the holding member 48 is disposed in or proximate to the channel distal portion 64 and the sliding member 50 is movably disposed in the channel 60 proximal the holding member 48. In an exemplary embodiment, the holding member 48 is disposed in the channel distal portion 64 coupled to the track 46 and/or the door body 30.

The hinge subassembly 52 is fastened or otherwise coupled to the bulkhead structure 22. An end portion 66 of the arm 54 is pivotally coupled to the hinge subassembly 52 about a rotational axis 68 that is different than the rotational axis 42. In an exemplary embodiment, the rotational axis 68 is offset from and parallel or substantially parallel to the rotational axis 42.

Figure 4:
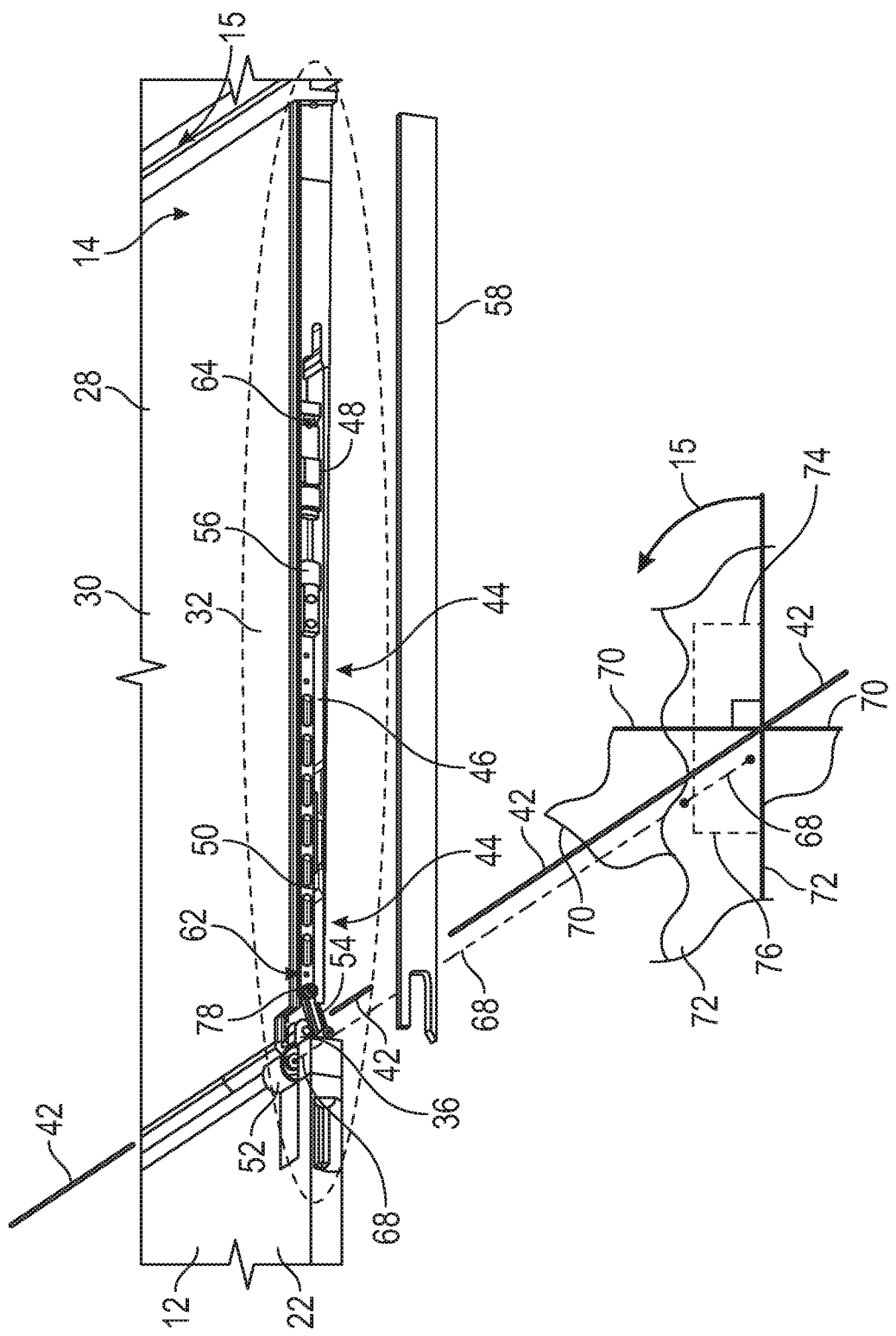
FIG. 4 illustrates a perspective bottom view of a portion of a door assembly mounted to a support structure in accordance with an exemplary embodiment.
Figure 5:
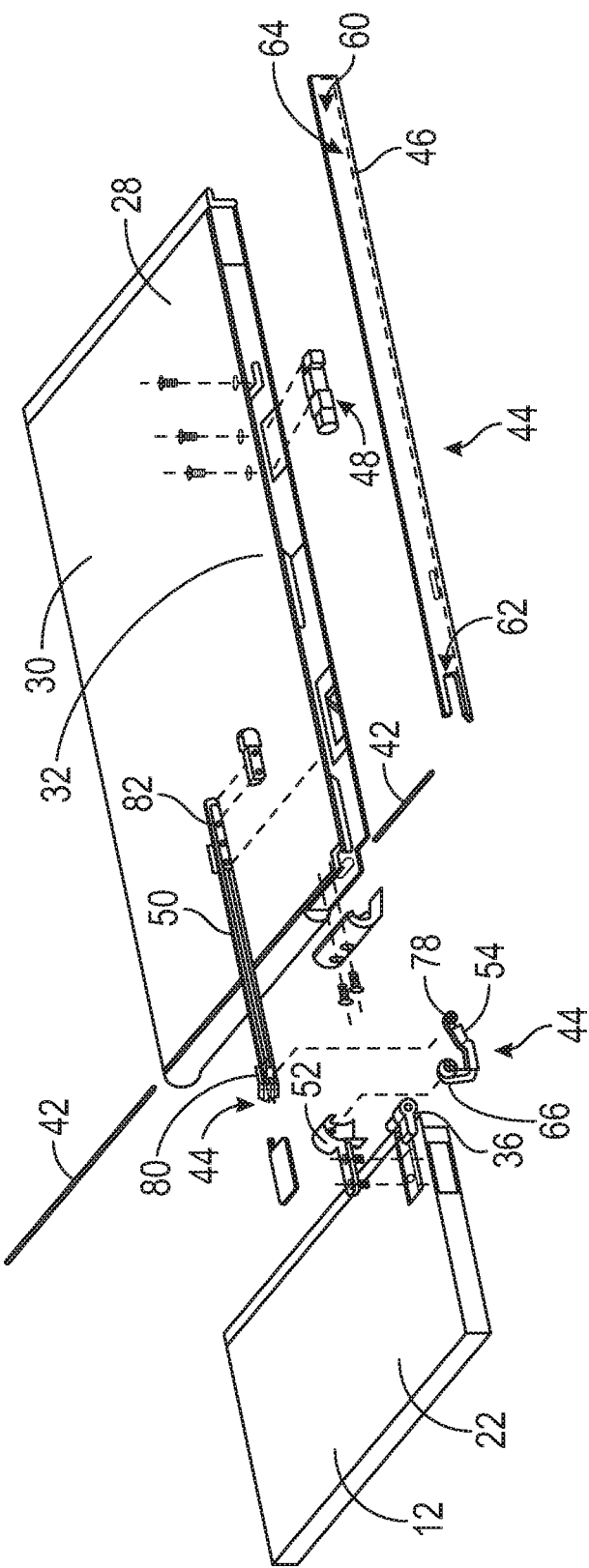
FIG. 5 illustrates an exploded view of a portion of a door assembly and a support structure in accordance with an exemplary embodiment.
Figure 6:
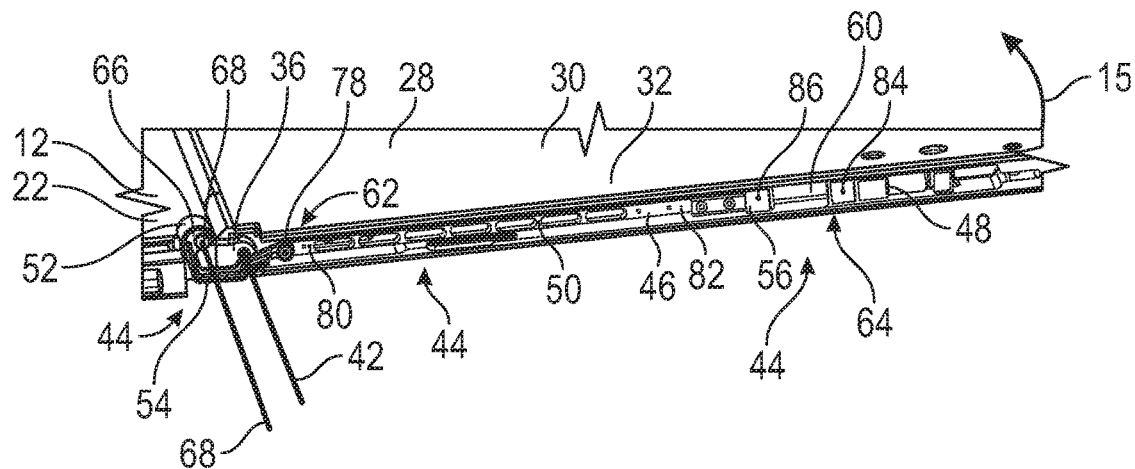
FIG. 6 illustrates a perspective bottom view of a portion of a door assembly mounted to a support structure in accordance with an exemplary embodiment.
Figure 7:
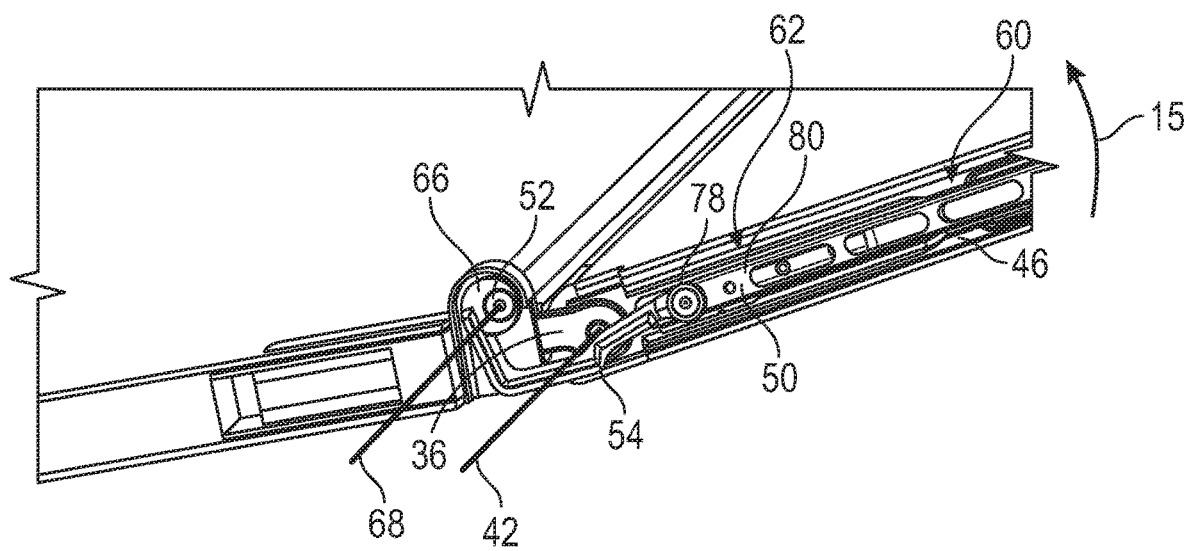
FIG. 7 illustrates a perspective bottom view of a portion of a door assembly mounted to a support structure in accordance with an exemplary embodiment.

Referring to FIG. 4, the rotational axis 42 is defined by the intersection of a plane 70 that is substantially parallel to the door 28 when in the closed position 14 and a plane 72 that is substantially perpendicular to the plane 70. When the door 28 moves from the closed position 14 towards the open position 16, the door 28 moves in the direction 15 from the plane 70 towards the plane 72 within a first quadrant 74 that is defined from an inboard side (e.g., upper facing side) of the plane 70 to an adjacent side (e.g., upper right hand side) of the plane 72 that faces the door 28. A second quadrant 76 is disposed adjacent to the first quadrant 74 and is defined from the side (e.g., upper left hand side) of the plane 72 to the inboard side (e.g., upper facing side) of the plane 70. As illustrated, the rotational axis 68 is disposed in the second quadrant 76 substantially parallel to the rotational axis 42 (e.g., disposed at the origin or intersection of the planes 70 and 72). In an exemplary embodiment, the rotational axis 68 is spaced apart from the upper left hand side of the plane 72 of from about 5 to about 35 mm, and independently, is spaced apart from the inboard side (e.g., upper facing side) of the plane 70 a distance of from about 5 to about 35 mm. As used herein, the term "about" when used to modify a value is understood to mean within normal manufacturing tolerance, such as +/−10%, such as +/−5%, such as +/−3%, for example +/−2%.

Referring to FIGS. 1-10, the arm 54 has an end portion 78 that is pivotally coupled to the sliding member 50 to move the sliding member 50 in the channel 60 between the channel proximal portion 62 and the channel distal portion 64 as the door 28 moves between the closed position 14 and the open position 16. In an exemplary embodiment, the arm 54 includes an "L-shaped" portion that is disposed between the end portions 66 and 78 such that when the door moves between the closed position 14 and the open position 16, the arm 54 is substantially covered by the lower door portion 32 so that the arm 54 is not visible during movement by a person opening and/or closing the door 28.

The stay member 56 is attached or otherwise coupled to the sliding member 50 and moves with the sliding member 50 towards the holding member 48 as the door 28 is moved from the closed position 14 to the open position 16. In an exemplary embodiment, the sliding member 50 is configured as a sliding bar that is slidingly coupled to the track 46 and that extends from a proximal bar end portion 80 to a distal bar end portion 82. The stay member 56 is coupled to the distal bar end portion 82 and, as such, the sliding bar provides a mechanical advantage as the stay member 56 is disposed a substantial distance away from the rotational axis 42 to facilitate holding the door 28 in the open position 16 as will discussed in further detail below.

Figure 8:
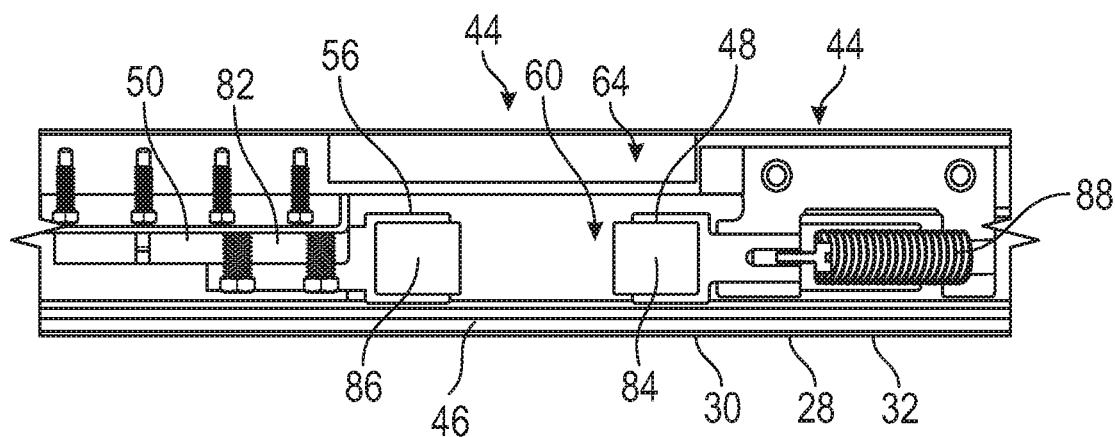
FIG. 8 illustrates a side view of a portion of a door assembly including a holding member and a stay member in accordance with an exemplary embodiment.
Figure 9:
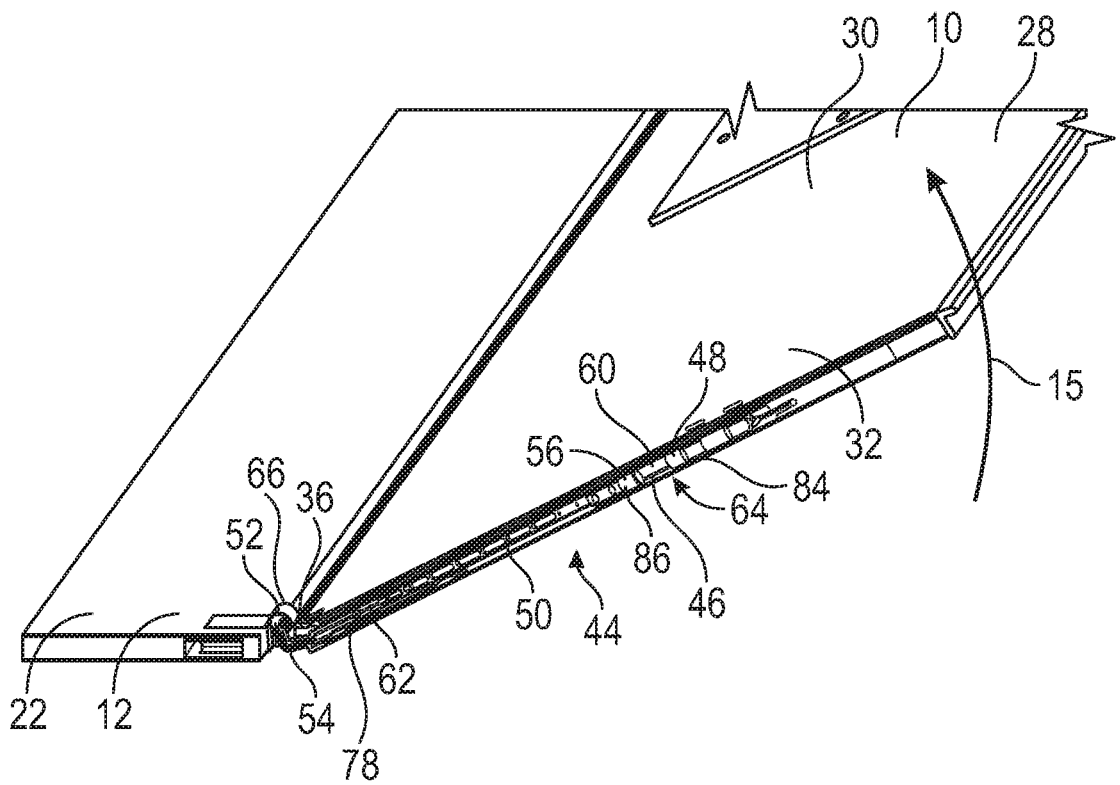
FIG. 9 illustrates a perspective bottom view of a portion of a door assembly mounted to a support structure in a partially open position in accordance with an exemplary embodiment.
Figure 10:
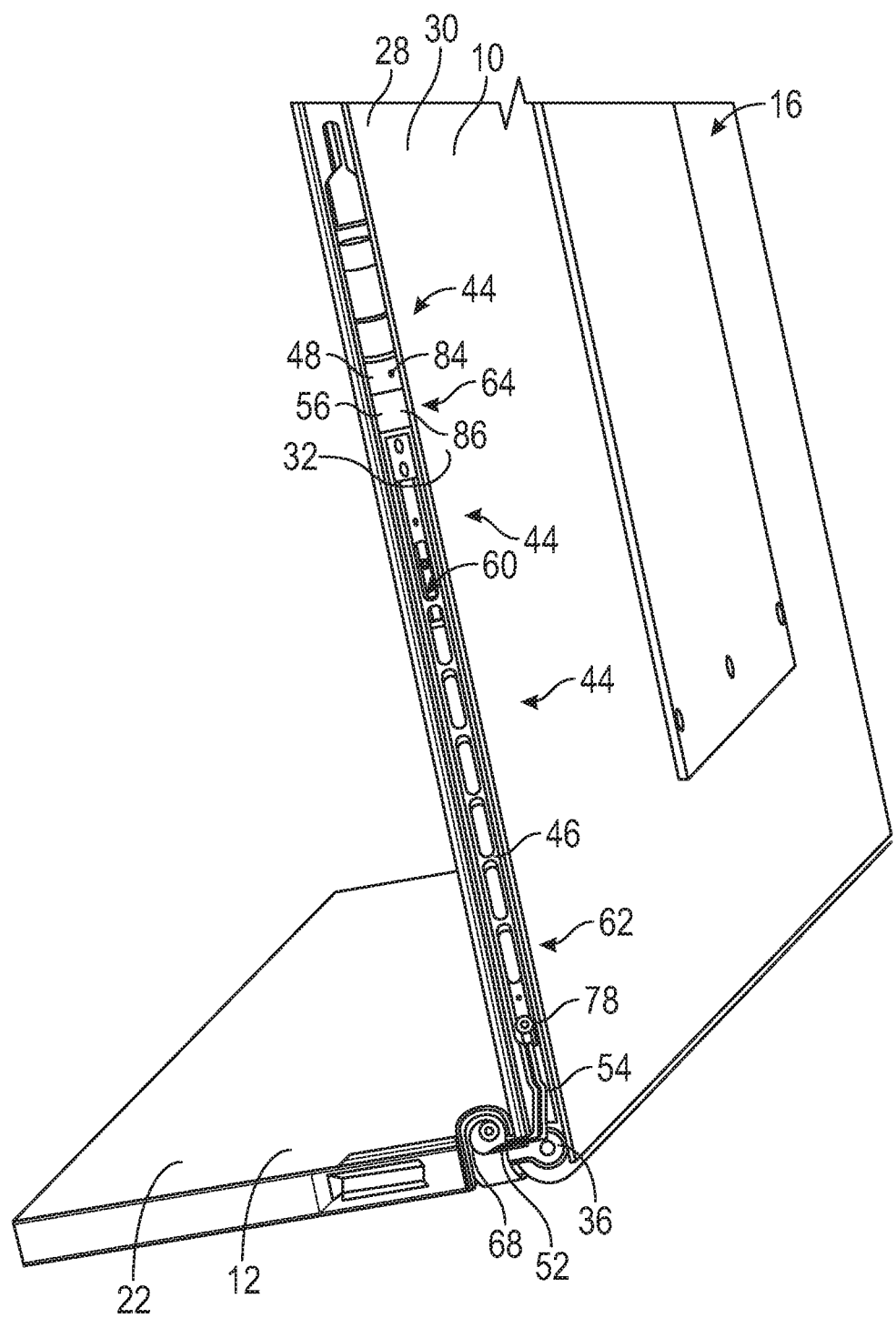
FIG. 10 illustrates a perspective bottom view of a portion of a door assembly mounted to a support structure in a fully open position in accordance with an exemplary embodiment.

In an exemplary embodiment, when the door 28 is in the open position 16 (as shown in FIG. 10), the stay member 56 is in contact with the holding member 48 and is held in position in the channel 60 by the holding member 48 to hold the door 28 open. Referring to FIGS. 8 and 10, in an exemplary embodiment, the holding member includes a magnet 84 and the stay member 56 includes a magnet 86 that are arranged such that the polarity of the magnets 84 and 86 are attracted towards each other. When the magnets 84 and 86 come into contact with each other, the magnet 86 remains releasably engage with the magnet 84, thereby releasably locking the position of the stay member 56, the sliding member 50, and the arm 54, which is indirectly supported by the support structure 12, to brace or otherwise hold the door 28 in the open position 16.

In an exemplary embodiment, the holding member 48 further includes a spring 88 that is operatively coupled to the magnet 84 to allow limited travel (e.g., in the distal direction) of the holding member 48 in the channel distal portion 64 when contacted by the stay member 56 during movement of the door 28, for example beyond the fully open position to prevent damage to the mechanism 44. In an exemplary embodiment, the stay member 56 is released from the holding member 48, for example to close the door 28, by applying a force (e.g., a force of about 8 pounds or greater, for example about 8 to 12 pounds of force or greater) to the door 28 sufficient to disengage the magnets 84 and 86 from each other.

Referring to FIGS. 13-16, in an alternative embodiment, the holding member 48 and the stay member 56 are cooperatively configured as a push-push mechanism 90 for holding the door 28 open and to selectively release the door from the open position. The holding member 48 includes a retainer subassembly 92 and the stay member 56 includes a barrel lock 94 that releasably engages the retainer subassembly 92 as part of the push-push mechanism 90. As illustrated, the barrel lock 94 has a collar portion 95 that is rotationally coupled to a shoulder screw 94, which is attached or otherwise coupled to the distal bar end portion 82 of the sliding member 50. As such, the barrel lock 94 can freely spin or otherwise rotate about the shoulder screw 94. Further, the barrel lock 94 has prongs 98 that extend radially outward from the collar portion 95.

The retainer subassembly 92 of the holding member 48 has an outer tubular portion 100 that is configured to receive the barrel lock 94 of the stay member 56 and that is operatively coupled to the spring 88 as discussed above. As illustrated, the outer tubular portion 100 has an inner wall surface 102 that defines spaced apart retaining features 104 and distal step features 106 that are distally spaced apart from the retaining features 104. In an exemplary embodiment, as the door 28 moves to the open position 16, the sliding member 50 moves the stay member 56 into the channel space of the holding member 48 that is surrounded by the outer tubular portion 100. The prongs 98 of the barrel lock 94 contact the proximal surfaces 108 of the retaining features 104 to rotate the barrel lock 94 and orient the prongs 98 such that the barrel lock 94 can be advanced distally past the spaced apart retaining features 104. As the barrel lock 94 is advanced distally, it contacts the proximal surfaces 110 of the distal step features 106 to partially rotate the barrel lock 94 such that the prongs 98 contact the distal surfaces 112 of the retaining features 104 to hold the stay member 56 in position and further, to hold the door 28 open.

To release the door 28 from the open position 16, the door 28 can be pushed past the fully open position 16 such that the barrel lock 94 is advanced distally to contact the proximal surfaces 110 of the distal step features 106. Upon contact, the proximal surfaces 110 partially rotate the barrel lock 94 such that the prongs 98 are oriented to pass through the open spaces between the retaining features 104 to allow the stay member 56 to move proximally and the door 28 to move towards the closed position 14.

Figure 11:
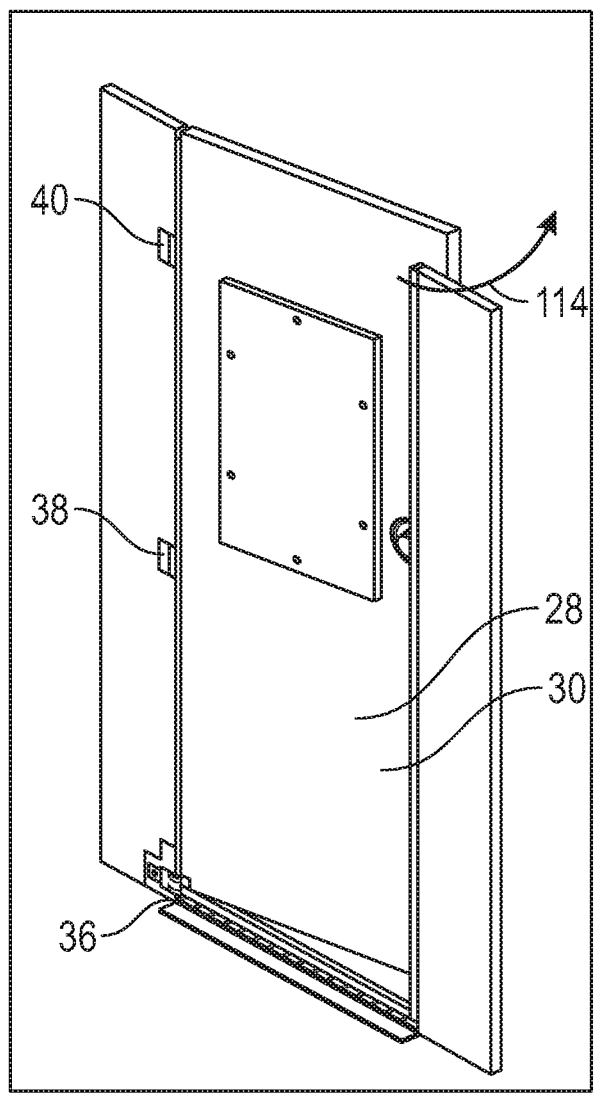
FIG. 11 illustrates a perspective front view of a door assembly mounted to a support structure in a hyperextended closed position in accordance with an exemplary embodiment.
Figure 12:
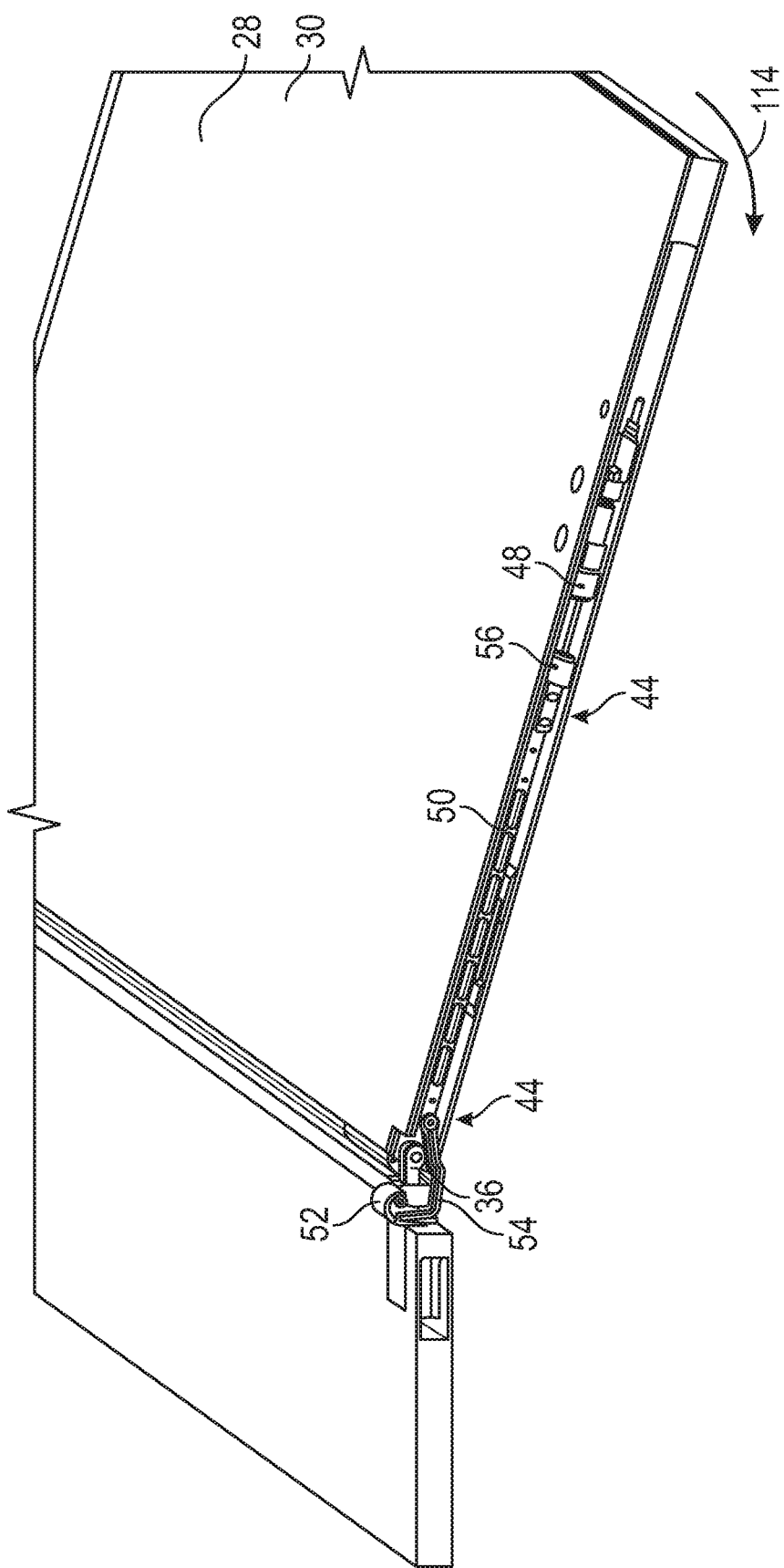
FIG. 12 illustrates a perspective bottom view of a portion of a door assembly mounted to a support structure in a hyperextended closed position in accordance with an exemplary embodiment.
Figure 13:
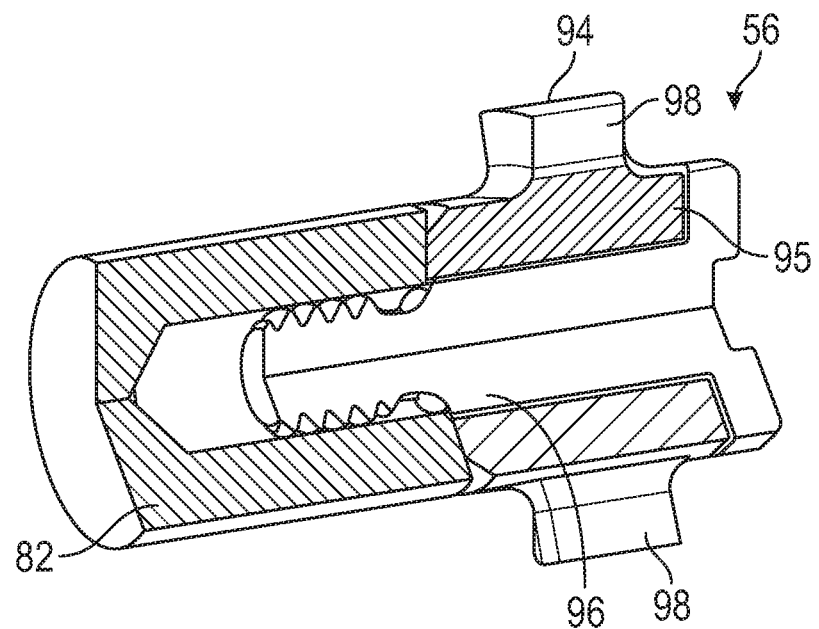
FIG. 13 illustrates a cut-away view of a stay member including a barrel lock in accordance with an exemplary embodiment.
Figure 14:
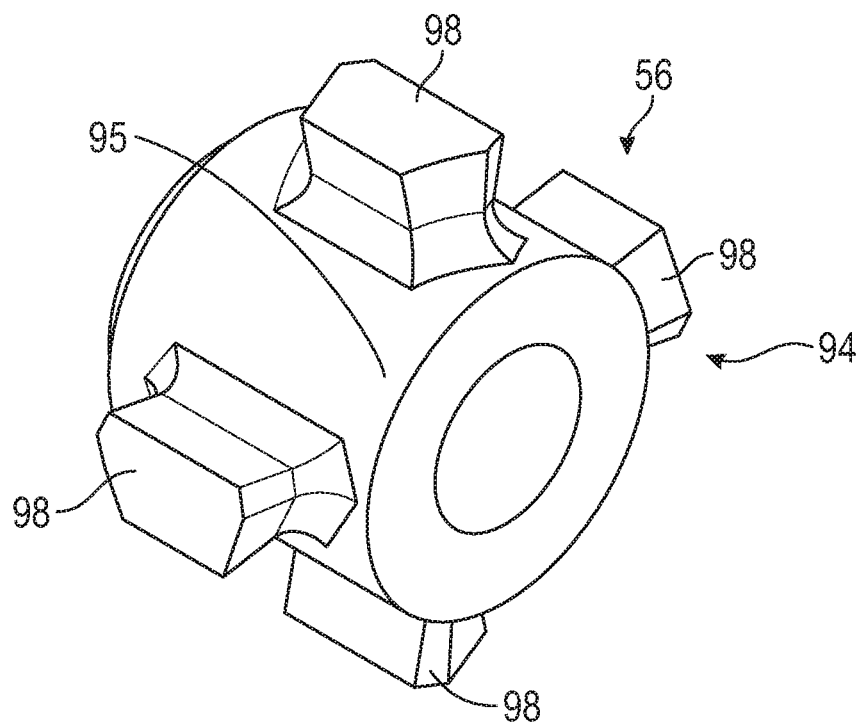
FIG. 14 illustrates a perspective side view of a barrel lock in accordance with an exemplary embodiment.
Figure 15:
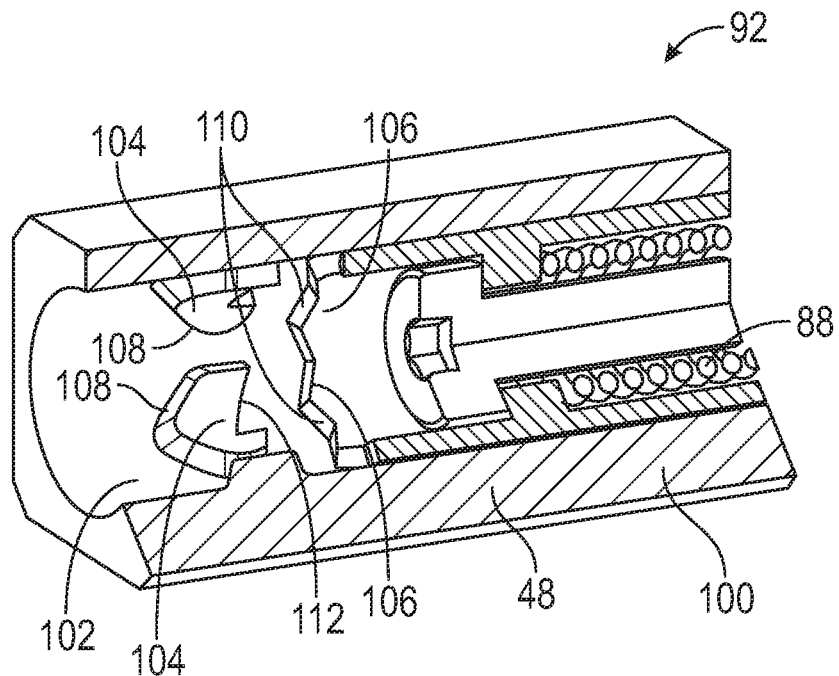
FIG. 15 illustrates a cut-away view of a holding member including a retainer subassembly in accordance with an exemplary embodiment.
Figure 16:
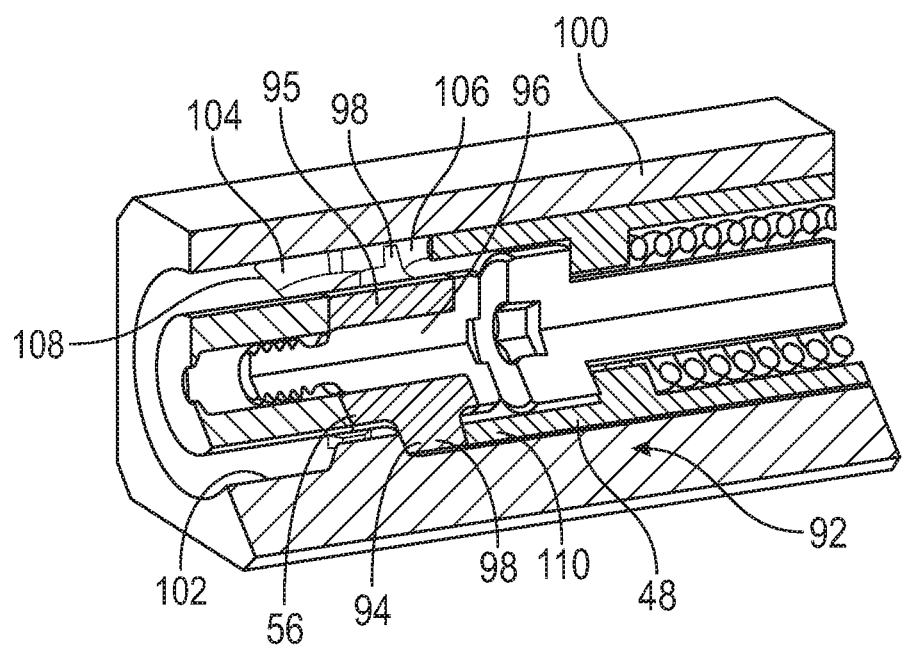
FIG. 16 illustrates a cut-away view of a stay member including a barrel lock engaged with a retainer subassembly of a holding member in accordance with an exemplary embodiment.

Referring to FIGS. 2 and 11-12, in an exemplary embodiment, the door hinge subassemblies 36, 38, and 40, the door 28, the holding member 48, the sliding member 50, the hinge subassembly 52, the arm 54, and the stay member 56 cooperate to allow the door 28 to move past the closed position 14 in a direction (indicated by single headed arrow 114) generally opposite the open position 16. In particular, the mechanism 44 includes enough additional travel in the channel 60 for the sliding member 50 to move proximally to allow the door 28 to move past the closed position 14, for example in the event of a rapid depressurization in the cabin area 24 of the aircraft 18.

Figure 17:
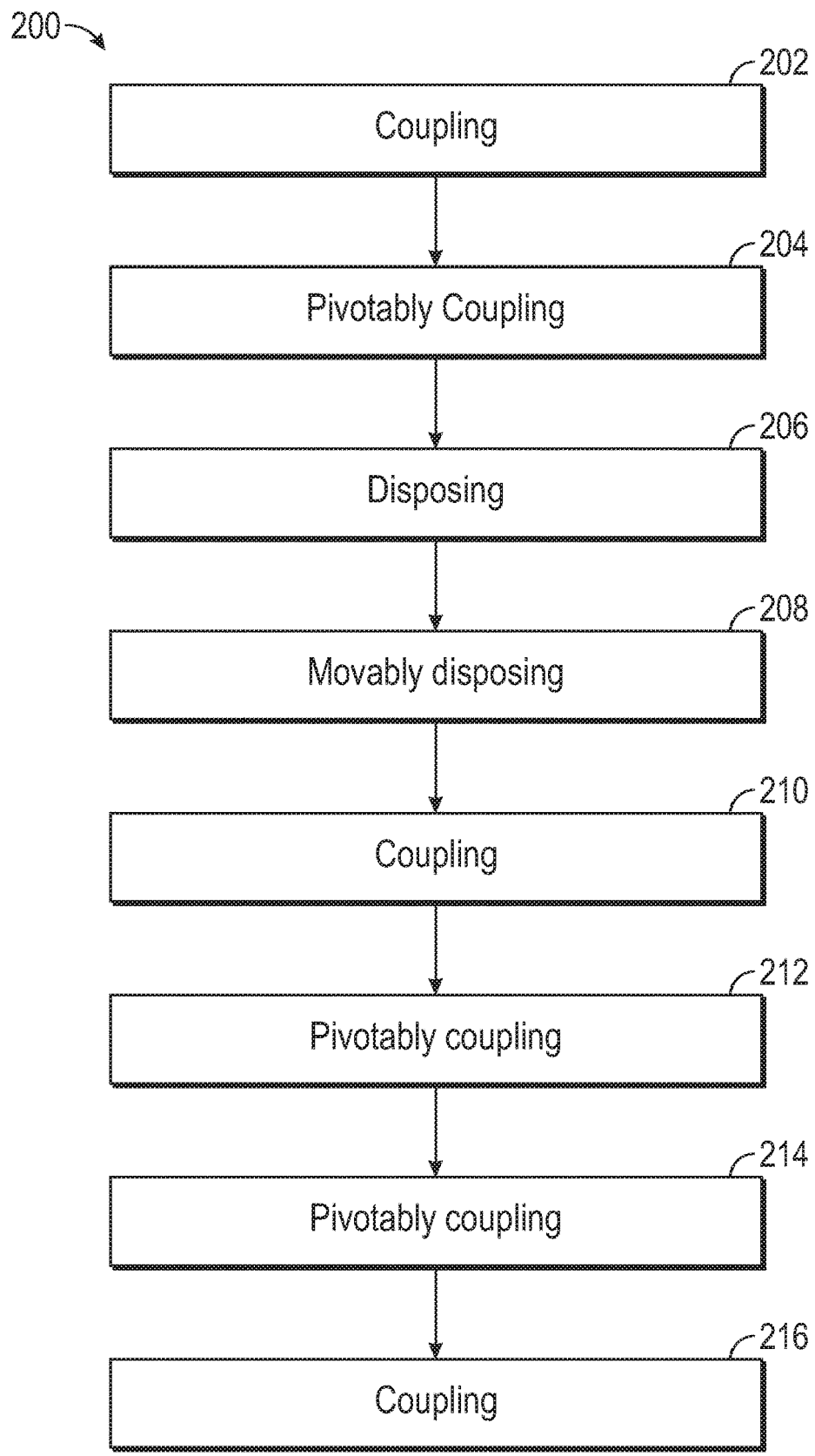
FIG. 17 illustrates a method for making a door assembly in accordance with an exemplary embodiment.

FIG. 17 illustrates a method 200 for making a door assembly in accordance with an exemplary embodiment. The method 200 includes coupling (STEP 202) a first hinge subassembly to a support structure. A door is pivotally coupling (STEP 204) to the first hinge subassembly about a first rotational axis for moving the door between a closed position and an open position. The door has a channel disposed therein extending from a channel proximal portion to a channel distal portion.

A holding member is disposed (206) proximate the channel distal portion. A sliding member is movably disposed (STEP 208) in the channel proximal the holding member. A second hinge subassembly is coupled (STEP 210) to the support structure.

A first portion of an arm is pivotally coupled (STEP 212) to the second hinge subassembly about a second rotational axis that is different from the first rotational axis. A second portion of the arm is pivotally coupled (STEP 214) to the sliding member for moving the sliding member in the channel when the door is moved between the closed position and open positions.

A stay member is coupled (STEP 216) to the sliding member. The stay member is configured to move with the sliding member towards the holding member and to be held in position by the holding member when the door is moved to the open position to hold the door open.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A door assembly comprising:
   a first hinge subassembly configured to couple to a support structure;
   a door pivotally coupled to the first hinge subassembly about a first rotational axis to move between a closed position and an open position, wherein the door has a channel disposed therein extending from a channel proximal portion to a channel distal portion;
   a holding member disposed proximate the channel distal portion;
   a sliding member movably disposed in the channel proximal the holding member;
   a second hinge subassembly configured to couple to the support structure;
   an arm having a first portion pivotally coupled to the second hinge subassembly about a second rotational axis that is different than the first rotational axis, and wherein the arm has a second portion that is pivotally coupled to the sliding member to move the sliding member in the channel between the channel proximal portion and the channel distal portion as the door moves between the closed position and the open position, respectively; and
   a stay member coupled to the sliding member and configured to move with the sliding member towards the holding member and to be held in position by the holding member when the door is moved to the open position to hold the door open.

2. The door assembly of claim 1, wherein the first rotational axis is defined by an intersection of a first plane that is substantially parallel to the door when in the closed position and a second plane that is substantially perpendicular to the first plane, and wherein the door opens in a first direction from the first plane towards the second plane within a first quadrant that is defined from a first inboard side of the first plane to a first side of the second plane that faces the door.

3. The door assembly of claim 2, wherein the second plane has a second side opposite the first side, and wherein a second quadrant is disposed adjacent to the first quadrant and is defined from the second side of the second plane to the first inboard side of the first plane, and wherein the second rotational axis is disposed in the second quadrant substantially parallel to the first rotational axis.

4. The door assembly of claim 3, wherein the second rotational axis is spaced apart from the second side of the second plane a distance of from about 5 to about 35 mm.

5. The door assembly of claim 3, wherein the second rotational axis is spaced apart from the first inboard side of the first plane a distance of from about 5 to about 35 mm.

6. The door assembly of claim 1, wherein the stay member includes a first magnet that is attracted to the holding member for holding the door open.

7. The door assembly of claim 6, wherein the holding member includes a second magnet and the first and second magnets are attracted towards each other for holding the door open.

8. The door assembly of claim 1, wherein the holding member and the stay member are cooperatively configured to define a push-push mechanism for holding the door open and to selectively release the door from the open position.

9. The door assembly of claim 8, wherein the holding member includes a retainer subassembly and the stay member includes a barrel lock that releasably engages the retainer subassembly as part of the push-push mechanism.

10. The door assembly of claim 1, wherein the arm includes an "L-shaped" portion.

11. The door assembly of claim 1, wherein the door comprises a door body and a track that is coupled to the door body and that defines the channel, and wherein the sliding member is configured as a sliding bar that is slidingly coupled to the track to move between the channel proximal portion and the channel distal portion.

12. The door assembly of claim 11, wherein the sliding bar extends from a proximal bar end portion to a distal bar end portion, and wherein the stay member is coupled to the distal bar end portion.

13. The door assembly of claim 11, wherein the holding member is disposed in the channel distal portion coupled to at least one of the track and the door body.

14. The door assembly of claim 11, wherein the door body extends vertically from a lower door portion to an upper door portion, and wherein the track, the sliding bar, the holding member, and the stay member are disposed in the lower door portion.

15. The door assembly of claim 14, further comprising a close out panel that is disposed along a lower-most section of the door body substantially covering the track, the sliding bar, the holding member, and the stay member.

16. The door assembly of claim 1, wherein the holding member includes a spring that allows limited travel of the holding member in the channel distal portion when contacted by the stay member during movement of the door.

17. The door assembly of claim 1, wherein the first hinge subassembly, the door, the holding member, the sliding member, the second hinge subassembly, the arm, and the stay member cooperate to allow the door to move past the closed position in a direction generally opposite the open position.

18. An aircraft comprising:
a fuselage comprising a bulkhead structure separating a cabin area and an adjacent area; and
a door assembly disposed between the cabin area and the adjacent area, the door assembly comprising:
a first hinge subassembly coupled to the bulkhead structure;
a door pivotally coupled to the first hinge subassembly about a first rotational axis to move between a closed position and an open position, wherein the door has a channel disposed therein extending from a channel proximal portion to a channel distal portion;
a holding member disposed proximate the channel distal portion;
a sliding member movably disposed in the channel proximal the holding member;
a second hinge subassembly coupled to the bulkhead structure;
an arm having a first portion pivotally coupled to the second hinge subassembly about a second rotational axis that is different than the first rotational axis, and wherein the arm has a second portion that is pivotally coupled to the sliding member to move the sliding member in the channel between the channel proximal portion and the channel distal portion as the door moves between the closed position and the open position, respectively; and
a stay member coupled to the sliding member and configured to move with the sliding member towards the holding member and to be held in position by the holding member when the door is moved to the open position to hold the door open.

19. The aircraft of claim 18, wherein the adjacent area is a lavatory area.

20. A method for making a door assembly comprising the steps of:
coupling a first hinge subassembly to a support structure;
pivotably coupling a door to the first hinge subassembly about a first rotational axis for moving the door between a closed position and an open position, wherein the door has a channel disposed therein extending from a channel proximal portion to a channel distal portion;
disposing a holding member proximate the channel distal portion;
movably disposing a sliding member in the channel proximal the holding member;
coupling a second hinge subassembly to the support structure;
pivotably coupling a first portion of an arm to the second hinge subassembly about a second rotational axis that is different from the first rotational axis;
pivotably coupling a second portion of the arm to the sliding member for moving the sliding member in the channel when the door is moved between the closed position and open positions; and
coupling a stay member to the sliding member, wherein the stay member is configured to move with the sliding member towards the holding member and to be held in position by the holding member when the door is moved to the open position to hold the door open.

* * * * *